(12) United States Patent
Wilhelmsson et al.

(10) Patent No.: US 8,909,267 B2
(45) Date of Patent: Dec. 9, 2014

(54) ENERGY-EFFICIENT DETECTION OF NETWORK CONNECTION REQUESTS

(75) Inventors: Leif Wilhelmsson, Dalby (SE); Bengt Lindoff, Bjärred (SE); Thomas Olsson, Karlshamn (SE); Anders Wallén, Ystad (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 322 days.

(21) Appl. No.: 13/451,088

(22) Filed: Apr. 19, 2012

(65) Prior Publication Data
US 2013/0281139 A1  Oct. 24, 2013

(51) Int. Cl.
*H04B 7/00* (2006.01)
(52) U.S. Cl.
USPC ......... 455/500; 455/522; 455/226.2; 370/252
(58) Field of Classification Search
CPC ... H04B 7/0413; H04B 1/1607; H04W 16/28; H04W 52/02
USPC .............................................. 455/450, 343.1
See application file for complete search history.

(56) References Cited

U.S. PATENT DOCUMENTS

| 4,811,362 | A  | * | 3/1989  | Yester et al. ................... 375/316 |
| 4,910,752 | A  | * | 3/1990  | Yester et al. ................... 375/316 |
| 5,655,019 | A  | * | 8/1997  | McKernan et al. ................ 455/1 |
| 6,067,291 | A  | * | 5/2000  | Kamerman et al. ........... 370/338 |
| 6,088,589 | A  | * | 7/2000  | Valentine et al. .............. 455/433 |
| 6,133,871 | A  | * | 10/2000 | Krasner .................... 342/357.74 |
| 6,519,236 | B1 | * | 2/2003  | Haartsen et al. ............... 370/332 |
| 6,678,508 | B1 | * | 1/2004  | Koilpillai et al. .............. 455/137 |
| 6,876,635 | B2 | * | 4/2005  | Bremer et al. ................. 370/311 |
| 7,023,824 | B2 | * | 4/2006  | Khullar ......................... 370/337 |
| 7,193,991 | B2 | * | 3/2007  | Melpignano et al. ......... 370/352 |
| 7,283,851 | B2 | * | 10/2007 | Persico et al. ................. 455/574 |

(Continued)

FOREIGN PATENT DOCUMENTS

| EP | 2222122 A1 | 8/2010 |
| GB | 2253972 A  | 9/1992 |
| WO | 9930535 A1 | 6/1999 |
| WO | 0159945 A1 | 8/2001 |

OTHER PUBLICATIONS

Dielacher, M. et al. "A BAW Based Transceiver Used as Wake-Up Receiver." 23rd International Conference on Architecture of Computing Systems (ARCS), 2010, pp. 1-6.

(Continued)

*Primary Examiner* — Hai V Nguyen
(74) *Attorney, Agent, or Firm* — Coats & Bennett, PLLC (57) ABSTRACT

Embodiments herein include a method implemented by a wireless device for detecting requests to connect to a wireless communications network. The method includes determining a receiver sensitivity that is sufficient, given channel conditions at the device, for the device to detect connection requests. The method then entails dynamically selecting, from among different receiver sensitivity configurations of the device, a configuration that has a receiver sensitivity at least as good as the determined sensitivity and that has less energy consumption than at least one other configuration. Finally, the method includes using the selected configuration for request detection. A wireless device herein thereby reduces its energy consumption when it is disconnected from the network, but intelligently limits the extent of that energy consumption reduction in order to maintain an ability to detect network connection requests.

30 Claims, 8 Drawing Sheets

(56) References Cited

U.S. PATENT DOCUMENTS

| | | | |
|---|---|---|---|
| 7,626,966 B1* | 12/2009 | Ruiter et al. | 370/337 |
| 7,664,465 B2* | 2/2010 | Shen et al. | 455/63.1 |
| 7,782,876 B2* | 8/2010 | Rogalski et al. | 370/401 |
| 7,860,527 B2* | 12/2010 | Ngai et al. | 455/552.1 |
| 7,983,230 B1* | 7/2011 | Li et al. | 370/338 |
| 8,174,383 B1* | 5/2012 | Chung et al. | 340/572.1 |
| 8,325,696 B2* | 12/2012 | Diener et al. | 370/341 |
| 8,457,798 B2* | 6/2013 | Hackett | 700/284 |
| 8,526,907 B2* | 9/2013 | Sivonen et al. | 455/343.1 |
| 8,583,070 B2* | 11/2013 | Khazei | 455/310 |
| 8,676,150 B2* | 3/2014 | Leoncavallo | 455/343.1 |
| 2001/0055988 A1* | 12/2001 | Blake et al. | 455/575 |
| 2002/0002034 A1* | 1/2002 | Davies et al. | 455/41 |
| 2002/0013129 A1* | 1/2002 | Davies | 455/41 |
| 2002/0094797 A1* | 7/2002 | Marshall et al. | 455/403 |
| 2003/0078006 A1* | 4/2003 | Mahany | 455/63 |
| 2003/0119568 A1 | 6/2003 | Menard | |
| 2004/0141484 A1* | 7/2004 | Rogalski et al. | 370/338 |
| 2005/0221790 A1* | 10/2005 | Persico et al. | 455/343.2 |
| 2007/0162834 A1* | 7/2007 | Banerjee | 714/784 |
| 2007/0184811 A1* | 8/2007 | Ballantyne | 455/343.2 |
| 2007/0262817 A1* | 11/2007 | Ciccarelli et al. | 330/278 |
| 2007/0264962 A1* | 11/2007 | Ueno et al. | 455/343.2 |
| 2008/0049816 A1* | 2/2008 | Nakajima | 375/148 |
| 2008/0056170 A1* | 3/2008 | Komulainen et al. | 370/311 |
| 2008/0108397 A1* | 5/2008 | Piipponen et al. | 455/574 |
| 2009/0067447 A1* | 3/2009 | Giaimo et al. | 370/431 |
| 2009/0233570 A1* | 9/2009 | Wang | 455/323 |
| 2011/0006824 A1 | 1/2011 | Kang et al. | |
| 2011/0132579 A1* | 6/2011 | Best et al. | 165/104.31 |
| 2011/0176434 A1* | 7/2011 | Pandey et al. | 370/252 |
| 2011/0256899 A1* | 10/2011 | Khazei | 455/517 |
| 2012/0071124 A1* | 3/2012 | Leoncavallo | 455/161.3 |
| 2012/0225687 A1* | 9/2012 | Norair | 455/522 |
| 2012/0263055 A1* | 10/2012 | Liu et al. | 370/252 |
| 2012/0327061 A1* | 12/2012 | Sirpal et al. | 345/211 |
| 2013/0027180 A1* | 1/2013 | Lakamraju et al. | 340/5.53 |

OTHER PUBLICATIONS

Dutta, R. et al. "Choosing Optimum Noise Figure and Data Rate in Wireless Sensor Network Radio Transceivers." 2011 IEEE International Conference on Communications (ICC), Jun. 5-9, 2011, pp. 1-5.

Demirkol, I. et al. "Wake-Up Receivers for Wireless Sensor Networks: Benefits and Challenges." IEEE Wireless Communications, Aug. 2009, pp. 88-96, vol. 16, Issue 4.

Su, R. et al. "Comparsion Between Preamble Sampling and Wake-Up Receivers in Wireless Sensor Networks." 2010 IEEE Global Telecommunications Conference (GLOBECOM 2010), Dec. 6-10, 2010, pp. 1-5.

Austriamicrosystems Datasheet. "AS3933—3D Low Frequency Wakeup Receiver." Revision 1.0, Released on Oct. 5, 2010 by austriamicrosystems, pp. 1-43, URL <http://www1.futureelectronics.com/doc/AUSTRIAMICROSYSTEMS/AS3933-BTST.pdf>.

\* cited by examiner

ENERGY-EFFICIENT DETECTION OF NETWORK CONNECTION REQUESTS

TECHNICAL FIELD

The present invention generally relates to a device that detects requests to connect to a wireless communications network, and more particularly relates to a device that detects network connection requests efficiently in terms of device energy consumption.

BACKGROUND

A wireless device in a wireless communications network typically employs different operational modes to reduce energy consumption when possible. For example, when a wireless device's receiver is not actively receiving user data from the network, the device may switch to an operational mode that maintains the device's receiver in a so-called "off" or "sleep" state. The device's receiver consumes less energy in this state, but cannot listen for or otherwise detect connection request (e.g., page or wake-up) signals requesting the device to connect to the network. Accordingly, to detect these connection request signals, the device may periodically switch back to a normal operational mode in which the receiver is "on" or "awake."

Although the device consumes less energy using this conventional sleep technique than if its receiver had remained awake constantly, the device still consumes a considerable amount of energy in periodically waking up its receiver. In addition, the fraction of time the receiver actually receives a connection request is typically very small, which means that most of the time the energy used during the wake-up period is wasted.

The considerable, wasteful energy consumption of the sleep technique prohibits its application in the context of Machine Type Communications (MTC) (also referred to as Machine-to-Machine, M2M, communications), where MTC devices must consume significantly less energy than other wireless device types. MTC devices must therefore resort to other energy consumption reduction techniques.

One such technique exploits the high signal strength typical of a dense MTC network. According to this technique, an MTC device employs two receivers, including a wake-up receiver and a conventional receiver. The device's wake-up receiver has a worse sensitivity than the device's conventional receiver. The wake-up receiver's sensitivity is worse because the wake-up receiver amplifies received signals less than the conventional receiver, meaning that the received signals must arrive at the wake-up receiver with higher signal strength than signals arriving at the conventional receiver in order to be detected. Generally, it is desirable for a receiver to be capable of detecting signals with as low of signal strength as possible. Looking at this receiver characteristic alone, therefore, the wake-up receiver is considered to have worse receiver sensitivity than the conventional receiver.

Despite the worse sensitivity of the wake-up receiver, the receiver is still able to receive a network connection request, since such a request has a high signal strength in the dense network. Moreover, the wake-up receiver consumes less energy than the conventional receiver (e.g., because the wake-up receiver amplifies received signals less). The device exploits these characteristics of the wake-up receiver and conventional receiver in order to reduce energy consumption. Specifically, the device maintains the energy-efficient wake-up receiver in a constant active state in order to listen for network connection requests, while maintaining the conventional receiver in a constant sleep state. Only when the wake-up receiver detects a network connection request does the receiver wake up the conventional receiver, whereupon the conventional receiver proceeds to receive data from the network.

Known techniques for reducing wireless device energy consumption therefore prove to have limited advantages and limited application scope. Some techniques (e.g., conventional sleep techniques) still consume and waste a considerable amount of energy, and do not reduce energy consumption enough for certain applications (e.g., MTC applications). Other techniques (e.g., wake-up receiver techniques) better reduce energy consumption, but do not accommodate applications characterized by relatively low signal strength (e.g., sparse MTC network applications or mobile communications applications).

SUMMARY

One or more embodiments herein advantageously reduce the energy consumption of a wireless device while maintaining the device with a receiver sensitivity sufficient for detecting network connection requests. In general, the embodiments reduce the device's energy consumption as channel conditions permit a worse receiver sensitivity for detecting network connection requests, but dynamically increase energy consumption as conditions necessitate a better receiver sensitivity for detecting network connection requests. By dynamically accounting for changing conditions affecting receiver sensitivity requirements, unlike known techniques, the embodiments prove advantageous in optimizing energy consumption across a wide range of applications.

More particularly, one or more embodiments herein include a method implemented by a wireless device for detecting requests to connect to a wireless communications network. The method includes determining a receiver sensitivity that is sufficient, given channel conditions at the device, for the device to detect connection requests. In one embodiment, this determination is made based on performing channel measurements at the device. In another embodiment, the determination is additionally or alternatively made based on receiving information from the network that directly or indirectly indicates the sensitivity sufficient for request detection. In one or more embodiments, the sensitivity determined as sufficient for request detection is calculated to be the worst sensitivity that still permits request detection.

In any case, the method then entails dynamically selecting, from among different receiver sensitivity configurations of the device, a configuration that has a receiver sensitivity at least as good as the determined receiver sensitivity and that has less energy consumption than at least one other configuration. Finally, the method includes using the selected configuration for detecting connection requests.

The specific way in which the device implements the various receiver sensitivity configurations may differ between different embodiments. In some embodiments, for example, the device implements the different receiver sensitivity configurations by adjusting a receiver sensitivity of a receiver in the device to different levels. In other embodiments, by contrast, the device implements the different receiver sensitivity configurations by employing different receivers for detecting connection requests. As an example of these latter embodiments, the device detects connection requests with an energy-efficient wake-up receiver when channel conditions permit a worse receiver sensitivity for request detection. However, the device dynamically switches to detecting connection requests with an energy-hungry conventional receiver as channel conditions necessitate a better receiver sensitivity for request detection.

In some embodiments, the network transmits a connection request to the wireless device without knowledge of the device's configuration selection, and without conditioning or otherwise targeting the request for receipt by the device at the selected receiver sensitivity. In other embodiments, by contrast, the network is indeed configured to target a network connection request for receipt by the device at a particular receiver sensitivity.

Specifically, one or more embodiments herein include a method by a wireless node for requesting a wireless device to connect to a wireless communications network. The method includes generating, using a first set of transmit parameters, a first connection request signal targeted for receipt by the wireless device at a first receiver sensitivity. The method also includes generating, using a second set of transmit parameters different from the first set, a second connection request signal targeted for receipt by the wireless device at a second receiver sensitivity different from the first receiver sensitivity. Finally, the method entails transmitting the first and second connection request signals to the wireless device for requesting that the device connect to the network.

In at least some embodiments, the wireless node generates and transmits the first and second connection request signals without having obtaining information indicating the receiver sensitivity that is sufficient, given channel conditions at the device, for the device to detect the first and second connection request signals. In one embodiment, for example, the node transmits the first and second signals at least partially overlapping in time, as alternative signals to be detected by the device. In another embodiment, the node transmits a connection request signal during each of a plurality of request intervals. In doing so, the node alternates between transmitting the first and second signals during different request intervals. That is, during one interval the node transmits the first signal and in another interval the node alternates to transmitting the second signal. Different intervals in this regard may occur immediately after one another in a non-overlapping fashion, or may be separated by non-request intervals.

In other embodiments, by contrast, the node generates and transmits the first and second connection request signals based on information indicating the receiver sensitivity that is sufficient, given channel conditions at the device, for the device to detect the first and second connection request signals. In this case, the node transmits the first signal when the obtained information indicates that the first receiver sensitivity is sufficient for request detection. And the node transmits the second signal when the obtained information indicates that the second receiver sensitivity is sufficient for request detection.

Yet other embodiments herein employ a combination of the above, by first transmitting the connection request signals without information on the sufficient receiver sensitivity, and then, when such information is obtained, transitioning to transmitting the signals based on that information. In one embodiment, for example, the node first alternates between transmitting the first and second signals during different request intervals. When the node receives a response, the node determines, based on when the response is received, whether the device responded to the first or second connection request signal. This indirectly indicates the sufficient receiver sensitivity at the device. The node then selectively transmits the first or second connection request signal during subsequent request intervals, depending respectively on whether the device responded to the first or second connection request signal.

In some embodiments, the wireless node respectively targets the first and second connection request signals for receipt by the wireless device at relatively worse and better receiver sensitivities. In doing so, the node in one or more embodiments generates the first signal to be received by the wireless device at a first frequency that is lower than a second frequency at which the device is to receive the second signal. By generating the first signal to be received at a lower frequency, the node effectively relaxes the receiver sensitivity required of the device to detect that first signal, as compared to that of the second signal.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
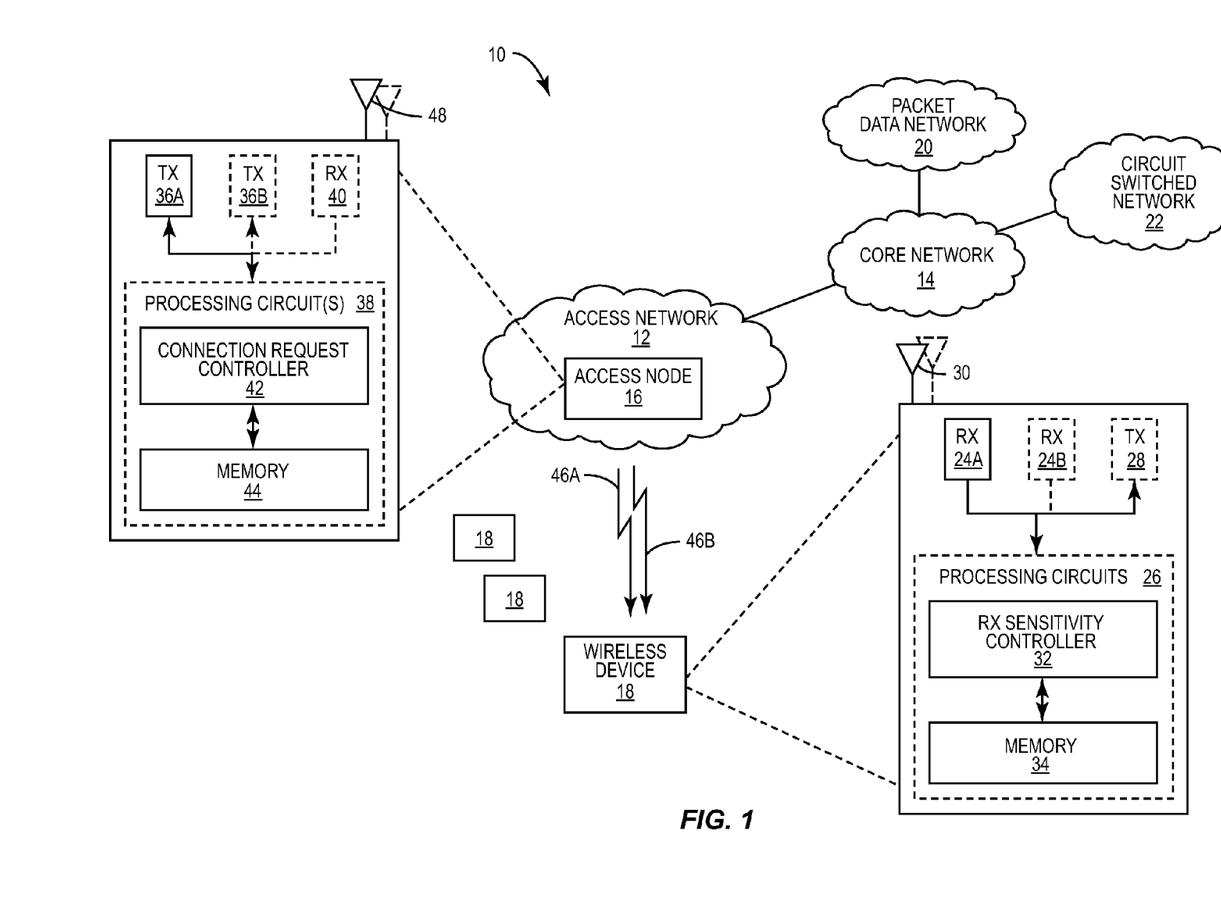
FIG. 1 is a block diagram of a wireless communications network that includes a wireless device for detecting requests to connect to the network, and a wireless node for transmitting such requests to the device, according to one or more embodiments.

FIG. 1 depicts a wireless communications network 10 according to one or more embodiments. As shown, the network includes an access network 12 and a core network 14. The access network 12 includes one or more access nodes 16 that wirelessly communicate with one or more wireless devices 18 in order to provide those devices 18 with access to the core network 14. The core network 14 correspondingly connects the devices 18 to one or more external networks, such as a packet data network 20 (e.g., the Internet) and/or a circuit switched network 22 (e.g., the Public Switched Telephone Network, PSTN).

A wireless device 18 and an access node 16 wirelessly communicate over wireless communication resources (e.g., time-frequency resources), according to one or more wireless communication protocols or standards. When the device 18 is not actively receiving data from the network 16 via the access node 16, the device 18 "disconnects" from the network 16 in order to release wireless communication resources for use by other devices 18. To later receive data from the network 10, the device 18 must "connect" to the network 10 again, whereupon in at least some embodiments the access node 16 "registers" or otherwise stores information indicating that the device 18 is connected to the network 10. In this regard, the device 18 transmits a connection request (e.g., a page or wake-up signal) to the network 10 when it has uplink data to send to the network 10. Conversely, the network 10 transmits a connection request to the device 18, via the access node 16, when it has downlink data to send to the device 18.

A wireless device 18 herein advantageously reduces its energy consumption when it is disconnected from the network 10. Notably, however, the device 18 intelligently limits the extent to which it reduces energy consumption in order to maintain an ability to detect connection requests from the network 10.

In more detail, FIG. 1 shows that a wireless device 18 includes one or more receivers 24 and one or more processing circuits 26. The device 18 may also include one or more transmitters 28. The one or more receivers 24 are configured to receive a connection request from an access node 16, via one or more antennas 30, requesting that the device 18 connect to the network 10. The one or more processing circuits 26 are configured to control the sensitivity of one or more of the receivers 24 (e.g., by controlling the amplifier gain of one or more of the receivers 24) in order to reduce the energy consumption of the device 10 when it is disconnected from the network 10.

Depicted in FIG. 1 as functionally including a receiver sensitivity controller 32 and a memory 34, the one or more processing circuits 26 are advantageously configured to do so by determining a receiver sensitivity that is sufficient, given channel conditions at the device, for the device 10 to detect connection requests from the network 10. The one or more processing circuits 26 then dynamically select, from among different receiver sensitivity configurations of the device 18, a configuration that has a receiver sensitivity at least as good as the determined receiver sensitivity and that has less energy consumption than at least one other configuration. The one or more processing circuits 26 thereafter configure the device 18 to use the selected configuration for detecting connection requests.

A configuration has a receiver sensitivity at least as good as the determined receiver sensitivity if the configuration's receiver sensitivity is sufficient, or is more than sufficient, for the device 18 to detect network connection requests given channel conditions at the device 18. That is, the configuration's receiver sensitivity does not require network connection request signals to arrive at the device 18 with a higher signal strength than the determined receiver sensitivity for detection. In at least some embodiments, for example, receiver sensitivity is defined in terms of the minimum input signal power at the device's antenna(s) required for the device 18 to detect network connection requests. In this case, a configuration's receiver sensitivity is at least as good as the determined receiver sensitivity if the minimum input signal power associated with that configuration is less than or equal to the minimum input signal power associated with the determined receiver sensitivity.

In one or more embodiments, a configuration's receiver sensitivity directly relates to the configuration's energy consumption. In this case, a first configuration that has a better receiver sensitivity than a second configuration does not require network connection request signals to arrive at the device 18 with as high of signal strength for detection, but consumes more energy than that second configuration. Accordingly, when the one or more processing circuits 26 select a configuration that has less energy consumption than at least one other configuration, the circuits 26 select a configuration that has worse receiver sensitivity than at least one other configuration.

Of course, channel conditions at the device 18 may sometimes require the processing circuits 26 to select the configuration that has the best receiver sensitivity and that has the most energy consumption. Otherwise, the device 18 may not be able to detect network connection requests under those channel conditions. But, as channel conditions change, the processing circuits 26 intelligently switch to selecting a configuration that has a worse receiver sensitivity and that has less energy consumption. In general, therefore, the processing circuits 26 select a configuration that has a receiver sensitivity at least as good as the determined receiver sensitivity (i.e., that has a receiver sensitivity sufficient for request detection). When multiple configurations have such a receiver sensitivity, the one or more processing circuits 26 select from among those multiple configurations a configuration that has less energy consumption than at least one other configuration.

By configuring the device 18 in this way, the one or more processing circuits 26 reduce the device's energy consumption as channel conditions permit a worse receiver sensitivity for detecting network connection requests, but dynamically increase energy consumption as conditions necessitate a better receiver sensitivity for detecting such requests. Because the embodiments dynamically account for changing conditions affecting receiver sensitivity requirements in this way, the embodiments prove advantageous in optimizing energy consumption across a wide range of applications. The embodiments may prove especially advantageous, for instance, where the network 10 comprises a sparse Machine Type Communications (MTC) network or a mobile communications network.

Regardless of the particular application in which the embodiments are employed, though, the specific way in which the device 18 implements the various receiver sensitivity configurations may differ between different embodiments. In some embodiments, for example, the device 18 implements the different receiver sensitivity configurations by adjusting a receiver sensitivity of a receiver 24A in the device 18. Thus, in this case, the processing circuits 26 adjust a receiver sensitivity of receiver 24A to different levels when using different receiver sensitivity configurations for detecting connection requests.

In other embodiments, by contrast, the device 18 implements the different receiver sensitivity configurations by employing different receivers for detecting connection requests. FIG. 1, for instance, shows the device 18 with two receivers 24A and 24B, where the receivers 24A, 24B have different receiver sensitivities. In this case, the processing circuits 26 detect connection requests with different receivers 24A, 24B when using different receiver sensitivity configurations.

In one example, receiver 24A is a conventional receiver primarily configured for receiving data with a better receiver sensitivity, while receiver 24B is a wake-up receiver primarily configured for receiving connection requests with a worse receiver sensitivity. Thus, in the above example, the processing circuits 26 detect connection requests with an energy-efficient wake-up receiver 24B when channel conditions permit a worse receiver sensitivity for request detection. However, the processing circuits 26 dynamically switch to detecting connection requests with the energy-hungry conventional receiver 24B as channel conditions necessitate a better receiver sensitivity for request detection.

Figure 2:
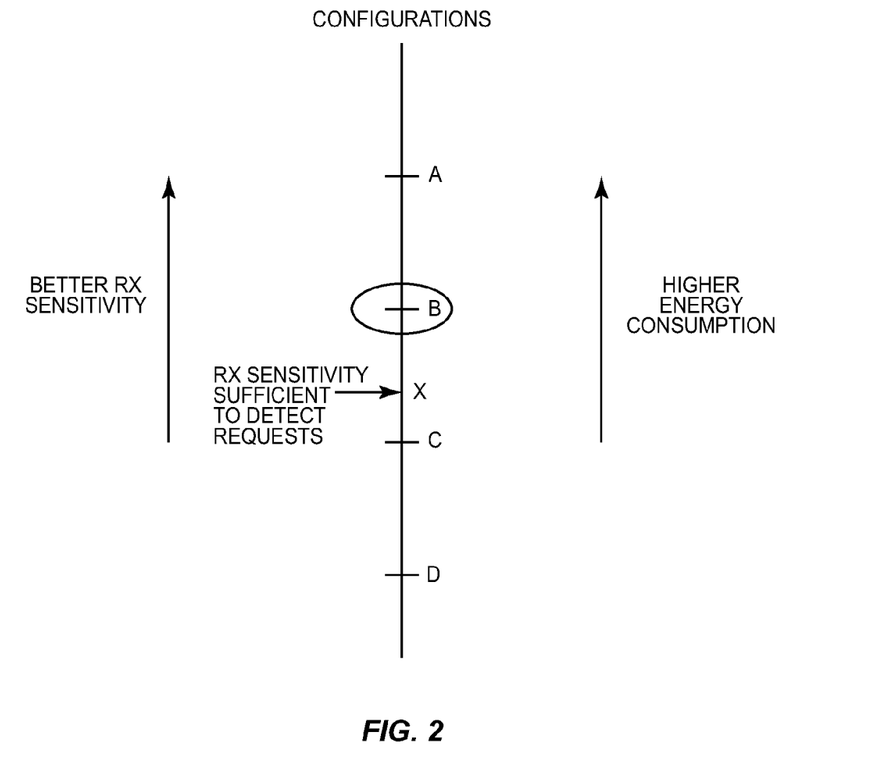
FIG. 2 depicts a simplified example of receiver sensitivity configuration selection performed by a wireless device herein according to one or more embodiments.

Those skilled in the art will of course appreciate that the above variations for implementing receiver sensitivity configurations may be combined. Indeed, doing so may permit implementation of more receiver sensitivity configurations than any individual variation would otherwise permit. This and other such embodiments may be advantageous because the granularity with which the device 18 optimizes or otherwise controls its energy consumption depends on the number of the device's receiver sensitivity configurations. That is, although embodiments herein contemplate any number of receiver sensitivity configurations greater than or equal to two, a greater number of configurations enable finer-grained energy consumption control. FIG. 2 illustrates a simple example where the device 18 employs four receiver sensitivity configurations (without regard to the particular implementation thereof).

As shown in FIG. 2, the device 18 has four receiver sensitivity configurations labeled A, B, C, and D. Configuration A has the best receiver sensitivity (measured in dBm in this example), followed by B, C, and then D with the worst receiver sensitivity. In this example, the amount of energy consumed by the device 10 when in any given receiver sensitivity configuration directly correlates with the receiver sensitivity provided by that configuration. Thus, configuration A not only has the best receiver sensitivity, but it also has the highest energy consumption. Configuration B has less energy consumption, followed by C and then D with the lowest energy consumption.

In the example of FIG. 2, the one or more processing circuits 26 of the device 18 determine that, given channel conditions at the device 18, a receiver sensitivity of X dBm is sufficient for the device 18 to detect network connection requests. The processing circuits 26 then dynamically select, from among configurations A, B, C, and D, a configuration that has a receiver sensitivity at least as good as X dBm. In the example, configurations C and D have a worse sensitivity than x dBm, while both configurations A and B have a receiver sensitivity better than X dBm. Accordingly, the processing circuits 26 select from between configurations A and B a configuration that has less energy consumption than at least one other configuration. Since in the example configuration A has the highest energy consumption, the processing circuits 26 select configuration B, which has less energy consumption than configuration A. The processing circuits 26 then configure the device 18 to use configuration B to detect network connection requests.

The one or more processing circuits 26 may of course be configured to perform this processing occasionally or periodically in order to dynamically account for changing channel conditions at the device 18 that affect receiver sensitivity requirements. At a later time, for example, the processing circuits 26 may determine that a better receiver sensitivity than that of configuration B is needed for the device to detect network connection requests, meaning that the processing circuits 26 may select configuration A. Or, if the processing circuits 26 determine that a worse receiver sensitivity than that of configuration C is sufficient to detect requests, the circuits 26 may select configuration C. Of course, the processing circuits 26 in this latter case may still select configuration B, as that configuration reduces power consumption as compared to configuration A, but selecting configuration C would reduce power consumption even more while still maintaining the ability to detect connection requests. In this regard, therefore, the one or more processing circuits 26 in some embodiments select the receiver sensitivity configuration that has the worst receiver sensitivity at least as good as the receiver sensitivity determined as sufficient for detecting connection requests. That is, the circuits 26 select, from among configurations with receiver sensitivities at least as good as the determined receiver sensitivity, the configuration with the worst receiver sensitivity.

Similarly, the processing circuits 26 in one or more embodiments determine the receiver sensitivity that is sufficient for detecting connection requests as being the substantially worst sensitivity that still permits request detection. Of course, this substantially worst sensitivity that still permits detection of connection requests may not be the true, physical worst sensitivity, but rather just the worst sensitivity determined based on real-world estimates of channel conditions at the device 10, accounting for measurement errors and other practical deviations. In this and other cases, therefore, the processing circuits 26 determine the sensitivity sufficient for detecting requests as being the substantially worst sensitivity that still permits request detection. Here, the substantially worst sensitivity that still permits request detection is a sensitivity within a nominal range or margin (e.g., +/−5%) of an otherwise determined worst sensitivity permitting request detection.

The particular way in which the one or more processing circuits 26 determine the receiver sensitivity sufficient for request detection may differ between different embodiments herein. In some embodiments, for example, the one or more processing circuits 26 are configured to determine this sufficient sensitivity autonomously, without direct assistance from the network 10. In this case, the one or more processing circuits 26 perform measurements of the channel conditions at the device 18, to obtain one or more metrics describing those conditions. The processing circuits 26 may determine, for example, one or more of a signal strength measurement, a signal-to-noise ratio (SNR), a channel quality indicator (CQI), or other channel condition metric. The processing circuits 26 then calculate, select, or otherwise determine the receiver sensitivity that is sufficient for request detection, based on the performed channel measurements.

In at least some embodiments, the processing circuits 26 use a particular one of the receiver sensitivity configurations to perform these channel measurements, to ensure the accuracy of those measurements. Specifically, the processing circuits 26 in these embodiments uses a configuration designated as a measurement configuration, where this measurement configuration has a better receiver sensitivity than that of at least one other configuration. The measurement configuration may, for instance, have the best receiver sensitivity (e.g., configuration A in FIG. 2). Accordingly, the one or more processing circuits 26 occasionally or periodically switch to the measurement configuration for the purpose of updating the device's channel measurements and thereby ensure that the device's configuration selection is based upon accurate, current channel conditions.

Figure 3:
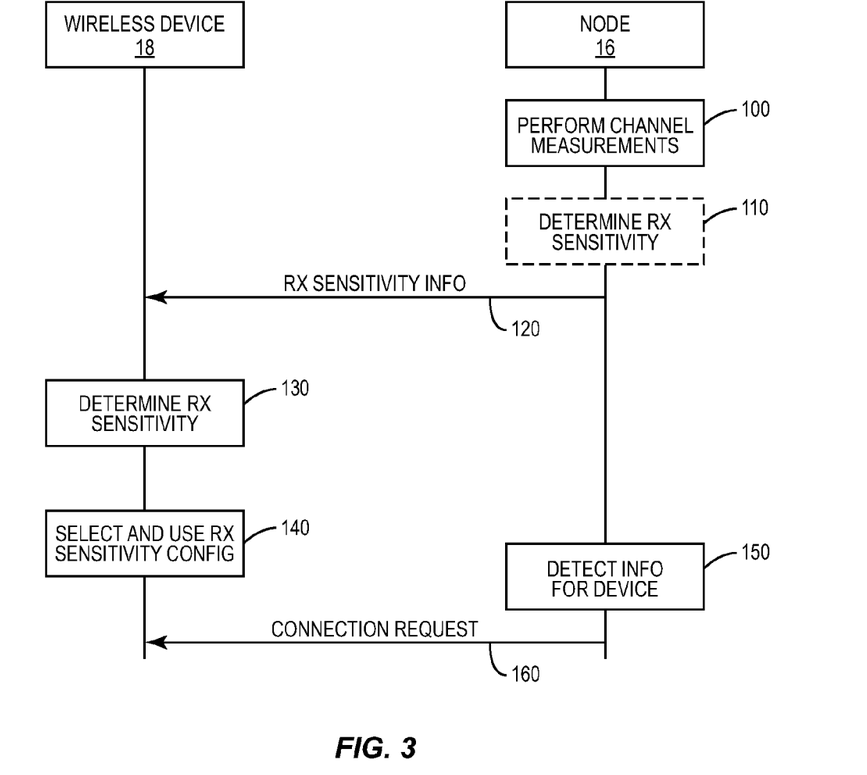
FIG. 3 is a call signaling flow diagram for receiver sensitivity configuration selection according to one or more embodiments.

In other embodiments, by contrast, the processing circuits 26 determine the receiver sensitivity sufficient for request detection based on information included in a received message. FIG. 3 illustrates an example of such embodiments, where the processing circuits 26 make the determination based on information included in a message received from an access node 16.

As shown in FIG. 3, the access node 16 performs measurements of the channel conditions at the device 18 (Step 100), rather than the device 18 performing those measurements itself. The access node 16 may, for instance, perform measurements of signals received from the device 18, to determine one or more of the channel condition metrics mentioned above. The access node 16 then sends the device 18 a message that directly or indirectly indicates the receiver sensitivity sufficient for request detection (Step 120). Specifically, the access node 16 may send the device 18 a message explicitly describing the results of the channel measurements performed by the node 16. The device 18 then deduces or otherwise determines the sufficient sensitivity based on that message. Alternatively, the access node 16 may actually determine the sensitivity sufficient for request detection (Step 110) and send the device 18 a message explicitly indicating the results of that determination. In any case, the device 18 determines the receiver sensitivity sufficient for request detection based on information included in the received message (Step 130), and then selects and uses a receiver sensitivity configuration as described above (Step 140). This way, when the access node 16 detects that information is to be transmitted to the device 16 (Step 150), the device 16 uses the selected configuration to detect a corresponding network connection request (Step 160).

Figure 4:
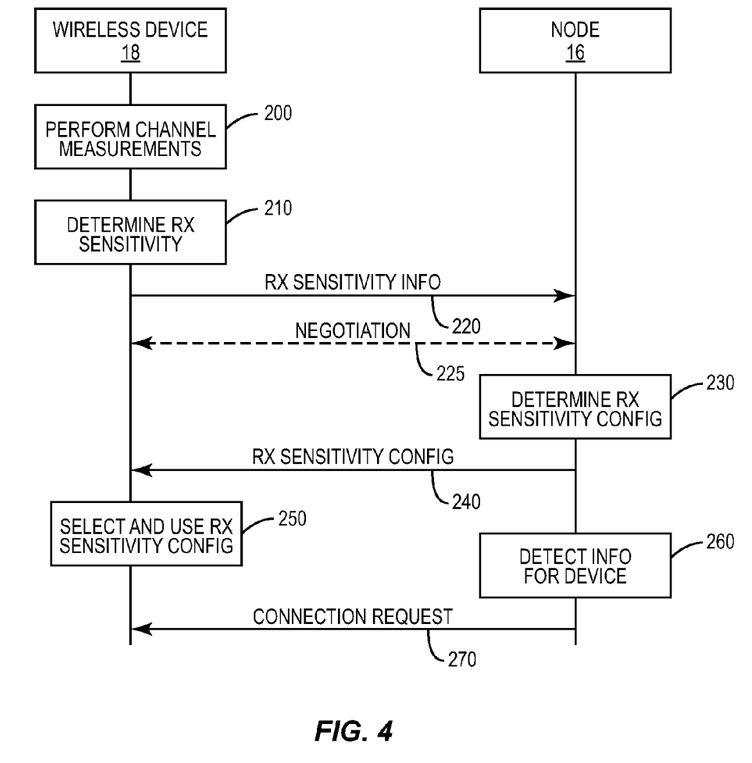
FIG. 4 is a call signaling flow diagram for receiver sensitivity configuration selection according to one or more other embodiments.

The particular way in which the one or more processing circuits 26 perform configuration selection may also differ between different embodiments. In some embodiments, for instance, the processing circuits 26 perform configuration selection autonomously, without direct assistance or instruction from the network 10. In other embodiments, however, the network 10 instructs the device 18 which configuration it is to ultimately select. FIG. 4 illustrates one example of this latter case.

As shown in FIG. 4, the processing circuits 26 perform measurements of the channel conditions at the device 18 (Step 200) and determine the receiver sensitivity sufficient for request detection based on those measurements (Block 210). The processing circuits 26 then send the access node 16 a message directly or indirectly reporting the sensitivity determined as sufficient (Step 220). This message may simply indicate the determined sensitivity to the access node 16 in an unbiased manner. Alternatively, the message may indicate the determined sensitivity in the context of a request for the device 18 to use a receiver sensitivity configuration corresponding to that sensitivity. In any case, the access node 16 determines the configuration to be used by the device 18 considering the sensitivity indicated as being sufficient for request detection (Step 230). The access node's determination may also consider any negotiations between with the device 18 that occur after receiving the message from the device (Step 225).

Once the access node 16 decides on the configuration to be used by the device 18, the node 16 sends a message to the device 18 indicating that decision (Step 240). The processing circuits 26 of the device 18 then perform configuration selection in accordance with the received message (Step 250). When the access node 16 detects that information is to be transmitted to the device 16 (Step 260), the device 16 uses the selected configuration to detect a corresponding network connection request (Step 270).

Figure 5:
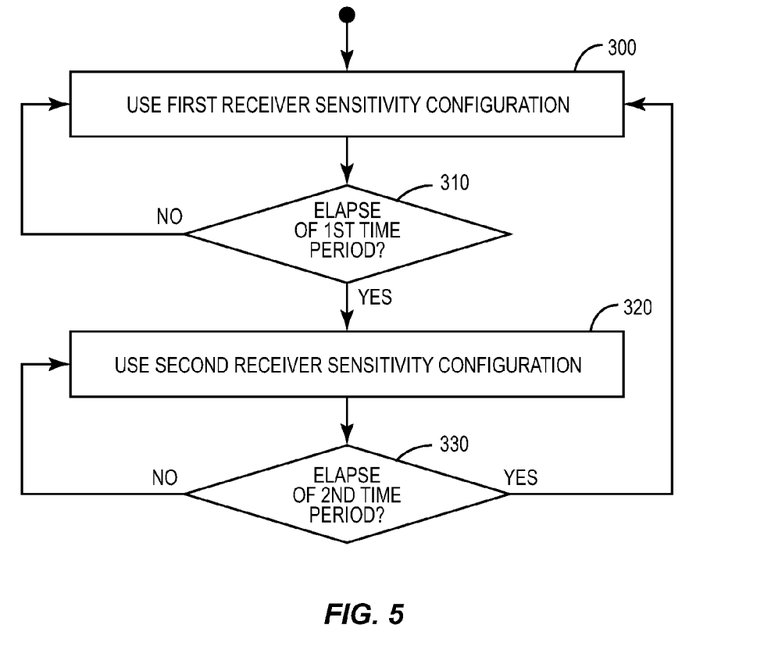
FIG. 5 is a logic flow diagram of a method for periodically forcing use of a receiver sensitivity configuration with a better receiver sensitivity, according to one or more embodiments.

As noted above, the device 18 may occasionally or periodically switch to a different configuration than the one selected in order to update the device's channel measurements, and thereby ensure that future configuration selections are based on accurate, current channel conditions. Additionally or alternatively, the device 18 may periodically switch to a different configuration than the one last selected in order to guard against missing network connection requests that have been transmitted under harsher channel conditions than those on which the last configuration selection was based. FIG. 5 illustrates processing according to one example of such embodiments.

As shown in FIG. 5, the processing circuits 26 select and use a first receiver sensitivity configuration that has a relatively worse receiver sensitivity (Block 300). If channel conditions have worsened since the processing circuits 26 selected the first configuration, then the device 18 may not be able to detect network connection requests using that configuration. To guard against this, the processing circuits 26 monitor for the elapse of a first time period (Block 310). This first time period may be defined as starting from the time at which the processing circuits 26 began using the first configuration, and ending at a defined offset from that start. When the processing circuits 26 have not detected a network connection request by the time this first time period elapses ("YES" at Block 310), the circuits 26 force the device 18 to use a second receiver sensitivity configuration that has a better receiver sensitivity (Block 320). That is, rather than selecting the second configuration based on channel conditions at the device 18, the processing circuits 26 select the second configuration simply based on elapse of the first time period. This way, even if channel conditions have worsened since selection of the first configuration, the device 18 will be able to detect any network connection requests that have been or would have been missed while using the first configuration.

Of course, connection requests might not have actually ever been transmitted to the device 18 while it was using the first configuration. Accordingly, in one or more embodiments, the processing circuits 26 may return to using the more energy-efficient first configuration after using the second configuration for a defined amount of time. Specifically, the processing circuits monitor for the elapse of a second time period (Block 330). This second time period may be defined as starting from the time at which the processing circuits 26 began using the second configuration, and ending at a defined offset from that start. When the processing circuits 26 have not detected a network connection request by the time this second time period elapses ("YES" at Block 330), the circuits 26 return the device 18 to using the first configuration (Block 300).

The embodiments described above generally focus on the configuration of the wireless device 18 for detecting a network connection request, without regard to the configuration of the access node 16 transmitting that request. Indeed, in some of these embodiments, the access node 16 transmits a network connection request to the wireless device 18 without knowledge of the device's configuration selection, and without conditioning or otherwise targeting the request for receipt by the device 18 at the selected receiver sensitivity. In other embodiments, by contrast, the access node 16 is indeed configured to target a network connection request for receipt by the device 18 at a particular receiver sensitivity.

Returning back to FIG. 1, for example, the access node 16 according to one or more embodiments includes one or more transmitters 36 and one or more processing circuits 38. The access node 16 may also include one or more receivers 40.

Depicted in FIG. 1 as functionally including a connection request controller 40 and a memory 44, the one or more processing circuits 38 are configured to generate, using a first set of transmit parameters, a first connection request signal 46A targeted for receipt by the wireless device 18 at a first receiver sensitivity. The one or more processing circuits 38 are also configured to generate, using a second set of transmit parameters different from the first set, a second connection request signal 46B targeted for receipt by the wireless device 18 at a second receiver sensitivity different from the first receiver sensitivity. Finally, the processing circuits 38 are configured to transmit the first and second connection request signals 46A, 46B, via the one or more transmitters 36 and one or more antennas 48, to the wireless device 18 for requesting that the device 18 connect to the network 10.

In at least some embodiments, the processing circuits 38 generate and transmit the first and second connection request signals 46A, 46B without having obtaining information indicating the receiver sensitivity that is sufficient, given channel conditions at the device 18, for the device 18 to detect the first and second connection request signals 46A, 46B. In one embodiment, for example, the processing circuits 38 transmit the first and second signals 46A, 46B at least partially overlapping in time, as alternative signals to be detected by the device 18. Indeed, with the first and second signals 46A, 46B targeted for receipt at different receiver sensitivities, the device 18 should be able to detect at least one of those signals 46A, 46B regardless of which receiver sensitivity configuration the device 18 is currently using. Those skilled in the art will therefore appreciate that although the access node 16 is described as transmitting two connection request signals 46A, 46B, the access node 16 may transmit additional connection request signals 46 as needed to match the number of possible receiver sensitivity configurations of the device 18.

In another embodiment, the processing circuits 38 transmit a connection request signal 46 during each of a plurality of request intervals. In doing so, the processing circuits 38 alternate between transmitting the first and second signals 46A, 46B during different request intervals. That is, during one interval the processing circuits 38 transmit the first signal 46A and in another interval the processing circuits 38 alternate to transmitting the second signal 46B. Different intervals in this regard may occur immediately after one another in a non-overlapping fashion, or may be separated by non-request intervals.

In other embodiments, by contrast, the processing circuits 38 generate and transmit the first and second connection request signals 46A, 46B based on information indicating a receiver sensitivity that is sufficient, given channel conditions at the device 18, for the device 18 to detect the first and second connection request signals 46A, 46B. Such information may be obtained by the processing circuits 38 based on feedback from the device 18, or based on channel measurements performed by the access node 16 itself. In any case, the processing circuits 38 in these embodiments transmit the first and second signals 46A, 46B at different times. Specifically, the processing circuits 38 transmit the first signal 46A targeted for receipt at a first receiver sensitivity, when the obtained information indicates that this first receiver sensitivity is sufficient for request detection. And the processing circuits 38 transmit the second signal 46B targeted for receipt at a second receiver sensitivity, when the obtained information indicates that this second receiver sensitivity is sufficient for request detection.

In at least one embodiment, the information obtained indirectly indicates the receiver sensitivity that is sufficient for the device 18 to detect the connection request signals 46A, 46B. In one example, the processing circuits 38 obtain this information in the form of a response to alternating connection request signal transmission. That is, the processing circuits 38 obtain a response from transmission of a connection request signal 46 to the device 18 and determines, based on when the response was received, whether the response was to transmission of the first or second request signal 46A, 46B. If the response was to transmission of the first signal 46A (meaning that the receiver sensitivity at the device 18 is sufficient for detecting the first signal 46A), the processing circuits 38 transmit the first signal 46A during subsequent request intervals (without alternating to transmission of the second signal 46B). Conversely, if the response was to transmission of the second signal 46B (meaning that the receiver sensitivity at the device 18 is sufficient for detecting the second signal 46B), the processing circuits 38 transmit the second signal 46B during subsequent request intervals (without alternating to transmission of the first signal 46A). In general, therefore, the processing circuits 38 selectively transmit the first or second connection request signal 46A, 46B during subsequent request intervals, depending respectively on whether the device 18 responded to the first or second connection request signal 46A, 46B.

Figure 6:
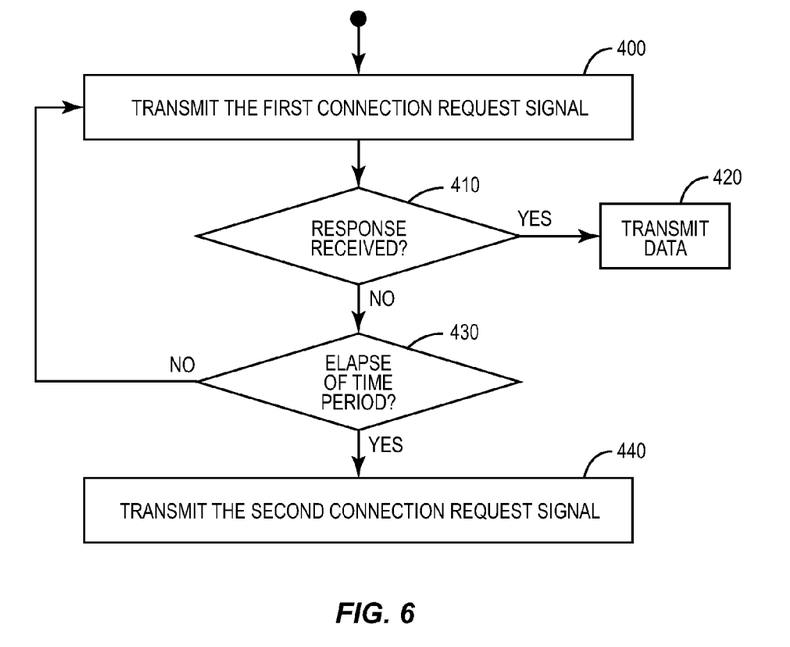
FIG. 6 is a logic flow diagram of a method for switching from transmitting a signal targeted for receipt at worse receiver sensitivity to transmitting a signal targeted for receipt at better receiver sensitivity, according to one or more embodiments.

The different times at which the access node 16 transmits the first and second signals 46A, 46B may also be intelligently based on recognizing whether the device 18 responds to a transmitted signal. FIG. 6 illustrates one example of such embodiments.

As shown in FIG. 6, the access node 16 transmits the first connection request signal 46A to the device 18 at a first time (Block 400). This first connection request is assumed here to be targeted for receipt at a worse receiver sensitivity than that of the second signal 46B; that is, the first receiver sensitivity is worse than the second receiver sensitivity. Upon transmitting the first signal 46A, the node 16 monitors for a response from the device 18 (Block 410). If a response is received ("YES" from Block 410), then the node 16 connects with the device 18 and transmits data to the device 18 (Block 420). Otherwise, when a response is not received within a defined time period ("YES" at Block 430), the processing circuits 38 of the node 16 assume that channel conditions at the device 18 preclude the device 18 from detecting the first signal 46A. Accordingly, the processing circuits 38 switch from transmitting the first signal 46A to transmitting the second signal 46B, since the second signal 46B is targeted for receipt by the device at a better receiver sensitivity (Block 440).

Although not shown in FIG. 6, the processing circuits 38 of the node 16 may be configured to switch back to transmitting the first signal 46A upon the elapse of a defined time period. In at least some embodiments, the processing circuits 38 synchronize the switching between transmitting the first and second signals 46A, 46B with the device's switching between the first and second receiver sensitivity configurations described in FIG. 5. Parameters and procedures ensuring that this synchronization is achieved may be determined through standardization and/or signaling.

Regardless of whether the first and second connection request signals 46A, 46B are transmitted at the same or different times, the processing circuits 38 generate those signals 46A, 46B to be targeted for receipt at different receiver sensitivities. The processing circuits 38 in particular generate the first and second signals 46A, 48B using first and second sets of transmit parameters.

Consider for instance embodiments where the processing circuits 38 target the first signal 46A for receipt at a worse receiver sensitivity than that of the second signal 46B; that is, the first receiver sensitivity is worse than the second receiver sensitivity. In this case, the sets of transmit parameters may generally dictate, for instance, that the processing circuits 38 generate the first signal 46A to be transmitted with a higher power than that of the second signal 46B. By transmitting the first signal 46A with higher power, the access node 16 effectively relaxes the receiver sensitivity required of the device 18 to detect that first signal 46A, as compared to that of the second signal 46B. Transmitting the first signal 46A with higher power than the second signal 46B may also entail transmitting the first signal 46B with higher power than that at which actual data is transmitted to the device 18. This may, however, only be possible when channel conditions at the device 18 are relatively good, since otherwise the data may need to be transmitted using higher power as well.

Alternatively or additionally, the sets of transmit parameters may dictate that the processing circuits 38 generate the first signal 46A for receipt by the wireless device 18 over a first frequency, and generate the second signal 46B for receipt by the wireless device 18 over a second frequency different than the first frequency. These different frequencies may be within the same frequency band or within different frequency bands, and may each be different or the same as the frequency over which actual data is transmitted to the device 18.

Regardless, in at least some embodiments, the processing circuits 38 generate the first signal 46A to be received by the wireless device 18 at a first frequency that is lower than the second frequency at which the device 18 is to receive the second signal 46B. By generating the first signal 46A to be received at a lower frequency, the access node 16 effectively relaxes the receiver sensitivity required of the device 18 to detect that first signal 46A, as compared to that of the second signal 46B. Indeed, the first signal 46A will be attenuated less than the second signal 46B because it is transmitted at a lower frequency. For example, if the access node 16 transmits the first signal 46A at a frequency of 200 MHz and the second signal 46B at a frequency of 2 GHz, the first signal 46A will suffer 20 dB less attenuation that the second signal 46B. This 20 dB less attenuation translates into a 20 dB relaxation in the receiver sensitivity required to detect the first signal 46A as compared to the second signal 46B.

Additionally or alternatively, the sets of transmit parameters may dictate that the processing circuits 38 generate the first signal 46A with higher order channel coding than that with which the second signal 46B is generated. To do so, the processing circuits 38 may for instance employ longer sequences for correlation with respect to the first signal 46A than those employed with respect to the second signal 46B. Generating the first signal 46A with higher order channel coding protects the first signal 46A against decoding errors due to being received with worse receiver sensitivity.

Those skilled in the art will of course appreciate counterpart processing in the wireless device 18 to accompany the access node's transmission of the first and second signals 46A, 46B. Nonetheless, as one example, the device 18 may be configured to listen for network connection requests to be received over different signals 46A, 46B when using different receiver sensitivity configurations. That is, the device 18 configures its one or more receivers 24 to listen for the first connection request signal 46A, consistent with the first set of transmit parameters, when using the first receiver sensitivity configuration. Conversely, the device 18 configures its one or more receivers 24 to listen for the second connection request signal 46B, consistent with the second set of transmit parameters, when using the second receiver sensitivity configuration.

Those skilled in the art will also appreciate that the above embodiments have been described as non-limiting examples, and have been simplified in many respects for ease of illustration. In this regard, no particular communication standard is necessary for practicing the embodiments herein. For example, the network 10 may comprise a cellular communications network, a wireless sensor network (WSN), or some other type of Machine Type Communications (MTC) network. A wireless device 18 herein may correspondingly comprise a mobile terminal, a user equipment, a laptop computer, a wireless sensor, an MTC device, or the like. Thus, the term wireless device is generally intended to include standalone wireless devices, such as cellphones and wireless-equipped personal digital assistants, as well as wireless cards or modules that are designed for attachment to or insertion into another electronic device, such as a personal computer, electrical meter, etc. Likewise, an access node 16 herein may comprise a base station (e.g., a Node B in Wideband CDMA networks or an evolved Node B in Long Term Evolution networks), a gateway, or any other type of node that provides the wireless devices 18 with wireless access to the network 10.

Those skilled in the art will further appreciate that the various "circuits" described may refer to a combination of analog and digital circuits, and/or one or more processors configured with software stored in memory 34, 44 and/or firmware stored in memory 34, 44 that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 7:
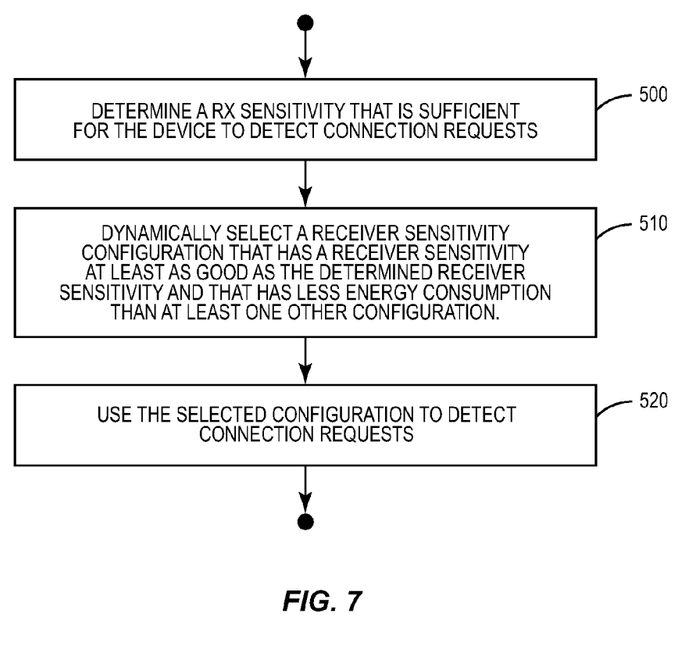
FIG. 7 is a logic flow diagram of a method implemented by a wireless device for detecting requests to connect to a wireless communications network, according to one or more embodiments.

With the above described modifications and variations in mind, those skilled in the art will understand that a wireless device 18 herein generally performs the processing illustrated in FIG. 7, for detecting requests to connect to a wireless communications network 10. As shown in FIG. 7, such processing includes determining a receiver sensitivity that is sufficient, given channel conditions at the device 18, for the device 18 to detect requests (Block 500). Processing further entails dynamically selecting, from among different receiver sensitivity configurations of the device 18, a configuration that has a receiver sensitivity at least as good as the determined receiver sensitivity and that has less energy consumption than at least one other configuration (Block 510). Finally, processing at the device 18 continues with using the selected configuration to detect network connection requests (Block 520).

Figure 8:
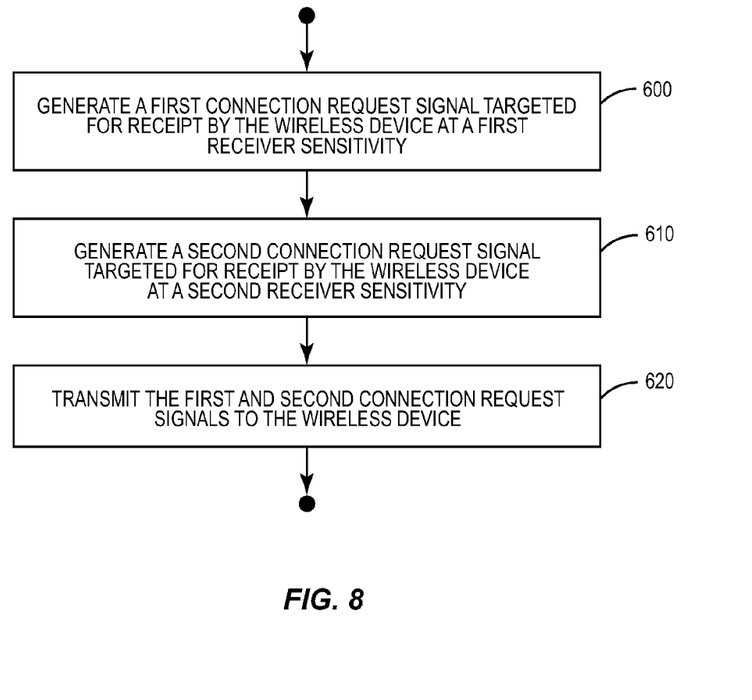
FIG. 8 is a logic flow diagram of a method implemented by a wireless node for requesting a wireless device to connect to a wireless communications network, according to one or more embodiments.

Those skilled in the art will also likewise understand that a wireless node 16 herein generally performs the processing illustrated in FIG. 8, for requesting a wireless device 18 to connect to a wireless communications network 10. As shown in FIG. 8, processing at the wireless node 16 includes generating, using a first set of transmit parameters, a first connection request signal 46A targeted for receipt by the wireless device 18 at a first receiver sensitivity (Block 600). Processing also includes generating, using a second set of transmit parameters different from the first set, a second connection request signal 46B targeted for receipt by the wireless device 18 at a second receiver sensitivity different from the first receiver sensitivity (Block 610). Finally, processing continues with transmitting the first and second connection request signals 46A, 46B to the wireless device 18 for requesting that the device 18 connect to the network 10.

The present invention may of course be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method implemented by a wireless device for detecting requests to connect to a wireless communications network, the method characterized by:
    determining a receiver sensitivity that is sufficient, given channel conditions at the device, for the device to detect said requests;
    dynamically selecting, from among different receiver sensitivity configurations of the device, a configuration that has a receiver sensitivity at least as good as the determined receiver sensitivity and that has less energy consumption than at least one other configuration;
    using the selected configuration to detect said requests; and
    listening for said requests over a first frequency when using a first one of the receiver sensitivity configurations, and listening for said requests over a second frequency using a second one of the receiver sensitivity configurations.

2. The method of claim 1, wherein said determining comprises determining the substantially worst receiver sensitivity that still permits the device to detect said requests.

3. The method of claim 1, wherein said selecting comprises selecting a configuration that has the worst receiver sensitivity at least as good as the determined receiver sensitivity.

4. The method of claim 1, further comprising detecting said requests with different receivers when using different receiver sensitivity configurations.

5. The method of claim 1, wherein the device comprises a receiver, and wherein the method further comprises adjusting a receiver sensitivity of the receiver to different levels when using different receiver sensitivity configurations.

6. The method of claim 1, further comprising listening for said requests to be received over different signals when using different receiver sensitivity configurations.

7. The method of claim 1, wherein said determining comprises:
    using a measurement configuration to perform channel measurements, wherein the measurement configuration is a receiver sensitivity configuration that has a better receiver sensitivity than that of at least one other configuration; and
    calculating the receiver sensitivity that is sufficient, based on the performed channel measurements, for the device to detect said requests.

8. The method of claim 1, wherein determining said receiver sensitivity comprises determining the receiver sensitivity based on information included in a received message.

9. The method of claim 1, further comprising reporting information to the network indicative of the determined receiver sensitivity.

10. The method of claim 1, further comprising:
    responsive to the elapse of a first time period since the device began using a first receiver sensitivity configuration that has a worse receiver sensitivity than that of a second receiver sensitivity configuration, forcing the device to use that second configuration; and
    responsive to the elapse of a second time period since the device was forced to use the second configuration, returning to using the first configuration.

11. A wireless device configured to detect requests to connect to a wireless communications network, the device comprising one or more receivers and one or more processing circuits configured to:
    determine a receiver sensitivity that is sufficient, given channel conditions at the device, for the device to detect said requests;
    dynamically select, from among different receiver sensitivity configurations of the device, a configuration that has a receiver sensitivity at least as good as the determined receiver sensitivity and that has less energy consumption than at least one other configuration;
    use the selected configuration to detect said requests; and
    listen for said requests over a first frequency when using a first one of the receiver sensitivity configurations, and listen for said requests over a second frequency when using a second one of the receiver sensitivity configurations.

12. The device of claim 11, wherein the one or more processing circuits are configured to determine the substantially worst receiver sensitivity that still permits the device to detect said requests.

13. The device of claim 11, wherein the one or more processing circuits are configured to select a configuration that has the worst receiver sensitivity at least as good as the determined receiver sensitivity.

14. The device of claim 11, wherein the one or more processing circuits are configured to detect said requests with different receivers when using different receiver sensitivity configurations.

15. The device of claim 11, wherein the one or more processing circuits are configured to adjust a receiver sensitivity of a given receiver to different levels when using different receiver sensitivity configurations.

16. The device of claim 11, wherein the one or more processing circuits are further configured to listen for said requests to be received over different signals when using different receiver sensitivity configurations.

17. The device of claim 11, wherein the one or more processing circuits are further configured to:
    use a measurement configuration to perform channel measurements, wherein the measurement configuration is a receiver sensitivity configuration that has a better receiver sensitivity than that of at least one other configuration; and
    calculate the receiver sensitivity that is sufficient, based on the performed channel measurements, for the device to detect said requests.

18. The device of claim 11, wherein the one or more processing circuits are configured to determine the receiver sensitivity based on information included in a received message.

19. The device of claim 11, further comprising a transmitter, and wherein the one or more processing circuits are further configured to report information to the network, via the transmitter, indicative of the determined receiver sensitivity.

20. The device of claim 11, wherein the one or more processing circuits are further configured to:
    responsive to the elapse of a first time period since the device began using a first receiver sensitivity configuration that has a worse receiver sensitivity than that of a second receiver sensitivity configuration, force the device to use that second configuration; and
    responsive to the elapse of a second time period since the device was forced to use the second configuration, return to using the first configuration.

21. A method implemented by a wireless node for requesting a wireless device to connect to a wireless communications network, the method comprising:
    generating, using a first set of transmit parameters, a first connection request signal targeted for receipt by the wireless device at a first receiver sensitivity;
    generating, using a second set of transmit parameters different from the first set, a second connection request signal targeted for receipt by the wireless device at a second receiver sensitivity different from the first receiver sensitivity; and transmitting the first and second connection request signals to the wireless device for requesting that the device connect to the network;

wherein said generating and transmitting are performed without having obtained information indicating a receiver sensitivity that is or is not sufficient, given channel conditions at the device, for the device to detect the first and second connection request signals.

22. The method of claim 21, wherein said transmitting comprises transmitting the first and second connection request signals at least partially overlapping in time.

23. The method of claim 21, wherein said transmitting comprises alternating between transmitting the first and second connection request signals during different request intervals, wherein transmission of either one of said request signals is not conditioned on whether a response is received to the other one of said request signals.

24. The method of claim 21, comprising generating the first connection request signal targeted for receipt by the wireless device over a first frequency and generating the second connection request signal targeted for receipt by the wireless device over a second frequency different that the first frequency.

25. The method of claim 24, wherein the first receiver sensitivity is worse than the second receiver sensitivity, and wherein the first frequency is lower than the second frequency.

26. A wireless node configured to request a wireless device to connect to a wireless communications network, the node comprising one or more transmitters and one or more processing circuits configured to:

generate, using a first set of transmit parameters, a first connection request signal targeted for receipt by the wireless device at a first receiver sensitivity;

generate, using a second set of transmit parameters different from the first set, a second connection request signal targeted for receipt by the wireless device at a second receiver sensitivity different from the first receiver sensitivity; and transmit the first and second connection request signals to the wireless device for requesting that the device connect to the network;

wherein the one or more processing circuits are configured to perform said generating and transmitting without having obtained information indicating a receiver sensitivity that is or is not sufficient, given channel conditions at the device, for the device to detect the first and second connection request signals.

27. The node of claim 26, wherein the one or more processing circuits are configured to transmit the first and second connection request signals at least partially overlapping in time.

28. The node of claim 26, wherein the one or more processing circuits are configured to alternate between transmitting the first and second connection request signals during different request intervals, wherein transmission of either one of said request signals is not conditioned on whether a response is received to the other one of said request signals.

29. The node of claim 26, wherein the one or more processing circuits are configured to generate the first connection request signal targeted for receipt by the wireless device over a first frequency and generate the second connection request signal targeted for receipt by the wireless device over a second frequency different that the first frequency.

30. The node of claim 29, wherein the first receiver sensitivity is worse than the second receiver sensitivity, and wherein the first frequency is lower than the second frequency.

* * * * *

UNITED STATES PATENT AND TRADEMARK OFFICE
CERTIFICATE OF CORRECTION

PATENT NO. : 8,909,267 B2  
APPLICATION NO. : 13/451088  
DATED : December 9, 2014  
INVENTOR(S) : Wilhelmsson et al.

Page 1 of 1

It is certified that error appears in the above-identified patent and that said Letters Patent is hereby corrected as shown below:

ON THE TITLE PAGE

On Page 2, in Item (56), under "OTHER PUBLICATIONS", in Column 2, Line 7, delete ""Comparsion" and insert -- "Comparison --, therefor.

IN THE SPECIFICATION

In Column 5, Line 5, delete "network 16 via" and insert -- network 10 via --, therefor.

In Column 5, Line 6, delete "network 16 in" and insert -- network 10 in --, therefor.

In Column 5, Line 35, delete "device 10" and insert -- device 18 --, therefor.

In Column 5, Line 41, delete "device 10" and insert -- device 18 --, therefor.

In Column 7, Line 29, delete "device 10" and insert -- device 18 --, therefor.

In Column 8, Line 21, delete "device 10," and insert -- device 18, --, therefor.

In Column 9, Line 24, delete "device 16 (Step 150), the device 16" and insert -- device 18 (Step 150), the device 18 --, therefor.

In Column 9, Line 40, delete "(Block 210)." and insert -- (Step 210). --, therefor.

In Column 9, Line 61, delete "device 16 (Step 260), the device 16" and insert -- device 18 (Step 260), the device 18 --, therefor.

In Column 10, Lines 63-64, delete "connection request controller 40" and insert -- connection request controller 42 --, therefor.

Signed and Sealed this  
Twenty-seventh Day of October, 2015

Michelle K. Lee  
*Director of the United States Patent and Trademark Office*